United States Patent [19]

Suzuki et al.

[11] Patent Number: 4,776,074
[45] Date of Patent: Oct. 11, 1988

[54] ROTARY SLIDE VANE COMPRESSOR

[75] Inventors: Shinichi Suzuki; Chuichi Kawamura; Shigeru Suzuki, all of Kariya, Japan

[73] Assignee: Kabushiki Kaisha Toyoda Jidoshokki Seisakusho, Aichi, Japan

[21] Appl. No.: 70,928

[22] Filed: Jul. 8, 1987

[30] Foreign Application Priority Data

Jul. 10, 1986 [JP] Japan .................. 61-162733

[51] Int. Cl.$^4$ ............................. B23P 15/00
[52] U.S. Cl. ................. 29/156.4 R; 29/418; 29/434
[58] Field of Search ............ 29/156.4 R, 156.4 WL, 29/418, 434; 384/273, 294, 906; 418/178, 179

[56] References Cited

U.S. PATENT DOCUMENTS 4,464,101 8/1984 Shibuya .................. 418/178 X
4,515,513 5/1985 Hayase et al. .............. 418/179 X Primary Examiner—Timothy V. Eley
Assistant Examiner—Frances Chin
Attorney, Agent, or Firm—Burgess, Ryan and Wayne

[57] ABSTRACT

A cylinder block of a rotary slide vane compressor, having an eccentric inner surface with split inner sleeve members embedded therein and in slidable contact with the vanes. The method for making the cylinder block comprises the steps of preparing an inner sleeve original form of a ferrous material and having a circumferentially closed integral portion. This original form is embedded in the inner surface of the cylinder of aluminum alloy during the step of casting the cylinder block, and thereafter, the cast cylinder block is machined together with the original form to cut away the circumferentially closed integral portion and thereby separate the original form into a plurality of split inner sleeve members.

8 Claims, 4 Drawing Sheets

ROTARY SLIDE VANE COMPRESSOR

BACKGROUND OF THE INVENTION

1. Field of the Invention

The present invention relates to a rotary slide vane compressor, and more particularly, to a method for making a cylinder block of a rotary slide vane compressor in which the cylinder block body is made from an aluminum alloy material and split sleeves of ferrous material are inserted in the aluminum alloy body to strengthen the inner surface of the cylinder block.

2. Description of the Related Art

A rotary slide vane compressor comprises a cylinder block with an eccentric inner surface and a rotor having a plurality of radial vanes. The radial vanes moves radially outwardly to cooperate with the elliptical inner surface of the cylinder block. The outer end of the vanes are normally in slidable contact with the eccentric inner surface of the cylinder block.

This type of rotary slide vane compressor is used in many fields. In particular, such a rotary slide vane compressor is used for a refrigerating apparatus in an automobile. However, to mount a rotary slide vane compressor on an automobile, the compressor must have a light weight structure. One attempt was made to satisfy this requirement by forming the cylinder block of the compressor from an aluminum alloy material. An aluminum alloy cylinder block successfully realizes the object of a light weight structure, but brings other problems in that premature wear of the inner surface of the cylinder block occurs during the operation of the compressor, due to the properties peculiar to aluminum alloys, because the outer end of the vanes are normally in slidable contact with the eccentric inner surface of the cylinder block. The eccentric inner surface of the cylinder block is provided with an opening for an intake port, and wear of the inner surface is usually greatest in the region near that opening.

To solve this problem, it has been proposed to fit inner sleeve members of ferrous material in the aluminum alloy cylinder block. These inner sleeve members are separate members and located in the long diameter portions of the elliptical inner surface of the cylinder block, respectively, at the position therein of the intake port opening. These inner sleeve members are embedded in the aluminum alloy cylinder block by inserting the sleeve members in the mold during the process of casting the block.

A problem arises in the manufacturing of this structure by the insert casting process to embed the inner sleeve members in the block. The separate inner sleeve members are not bound together, and thus tend to be forced radially inwardly and out of position by the pressure of the poured molten metal (aluminum alloy). Therefore, after the casting process, the cylinder block with the offset inner sleeve members must be machine finished, resulting in an excessive cutting of the inner sleeve members. Accordingly, it is not possible to ensure that the inner sleeve members have a predetermined thickness on the inner surface of the cylinder block. To obtain inner sleeve members having a thickness sufficient to overcome the above problems, it is possible to prepare inner sleeve members having originally a greater thickness, but the greater the thickness of the inner sleeve member, the thinner is the thickness of the aluminum alloy cylinder block portion. This leads to an increase in the weight of the cylinder block because of the higher percentage of ferrous material therein, and reduces the strength of the block. Further, the difference of thermal expansion between the aluminum alloy and the ferrous material causes the formation of steps or a discontinuity in the inner surface of the cylinder block.

SUMMARY OF THE INVENTION

The object of the present invention is to provide a method for making a cylinder block of a rotary compressor with radial vanes, in which the cylinder block is made mainly from an aluminum alloy with inner sleeve members of ferrous material embedded in the inner surface of the cylinder block, which inner sleeve members can be held in position and have a predetermined thickness.

The above object is solved by a method for making a cylinder block of a rotary compressor with radial vanes, the cylinder block having an eccentric inner surface in slidable cooperation with the radial vanes. According to the present invention, the method comprises the steps of: preparing an inner sleeve means of ferrous material having at least a circumferentially closed integral portion; casting an outer body of the cylinder block from an aluminum alloy material while embedding the inner sleeve means in the outer body; and thereafter, machining the inner sleeve to cut away the circumferentially closed integral portion, thereby forming the inner sleeve into a plurality of split inner sleeve members which constitute the eccentric inner surface of the cylinder block together with the aluminum alloy material inserted between the split inner sleeve members.

The inner sleeve means having the circumferentially closed integral portion is provided with a rigidity sufficient to maintain the original shape thereof even when subjected to a molding pressure. Therefore, the resultant inner sleeve members can be exactly located relative to each other and relative to the cylinder block, and thus it is possible to make the thickness of the inner sleeve members relatively thin even though they are to be subjected to a machining operation after the casting process. These thin walled inner sleeve members are elastically deformable and can absorb the difference of thermal expansion between the aluminum alloy cylinder block and the ferrous inner sleeve members, thus maintaining a smooth inner surface of the cylinder block by preventing the possible occurrence of steps between the inner sleeve member and inner projecting walls.

The inner sleeve means preferably comprises a pair of longitudinally extending recesses located at diametrically opposite positions relative to the short diameter portion of the cylinder block and opening at least at the outer surface of the inner sleeve means, thereby allowing the aluminum alloy material to enter the longitudinally extending recesses during the casting step. In one embodiment, the recesses are a pair of longitudinally extending slits and the inner sleeve means comprises a pair of circumferentially closed integral portions at the top and the bottom thereof to define the slits. These circumferentially closed integral portions at the top and the bottom are removed during the machining step to separate the inner sleeve means into two split inner sleeve members and the aluminum alloy material entering the longitudinally extending slits during the casting step becomes a part of the inner surface of the cylinder block between the two split inner sleeve members.

In the alternative embodiment, the recesses are a pair of longitudinally extending grooves opening at the outer surface of the inner sleeve means and the inner sleeve means has a circumferentially consecutive inner wall which constitutes the bottom wall of the grooves, the circumferentially consecutive inner wall being removed during the machining step and the aluminum alloy material entering the longitudinally extending grooves during the casting step separates the two split inner sleeve members and becomes a part of the inner surface of the cylinder block between the two split inner sleeve members.

BRIEF DESCRIPTION OF THE DRAWINGS

The present invention will be described in greater detail with regard to the embodiments of the present invention in reference to the attached drawings, in which.

DESCRIPTION OF THE PREFERRED EMBODIMENTS

Figure 1:
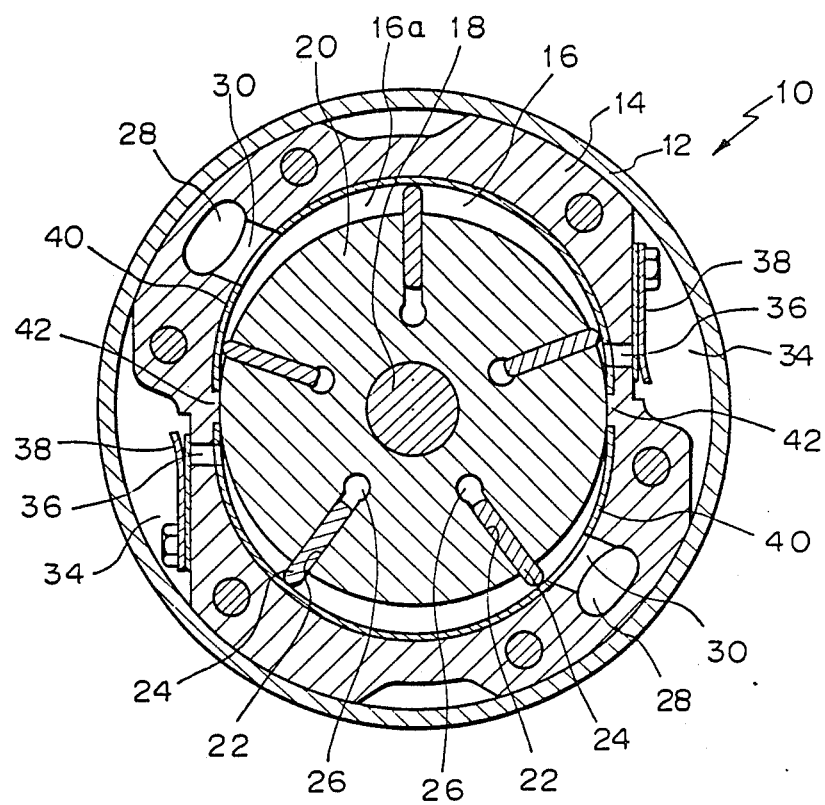
FIG. 1 is cross-sectional view of a rotary slide vane compressor manufactured by the method in accordance with the present invention.

FIG. 1 is a cross-section view of a rotary compressor 10 manufactured, according to the method of the present invention. The rotary compressor 10 has a housing 12 in which a stationary cylinder block 14 is located. The housing 12 also includes front and rear plates (not shown) fitting the front and rear side faces of the cylinder block 14, respectively, thereby defining an enclosed internal space 16 within the cylinder block 14. The cylinder block 14 has an eccentric, elliptic inner surface, which is well known in the art, comprising a long diameter portion, seen in the vertical direction in FIG. 1 and a short diameter portion, seen in the horizontal direction in FIG. 1.

A rotor shaft 18, which extends through one of the front and rear plates and is coupled to a drive source (not shown), supports a circular rotor 20 within the cylinder block 14. The rotor 20 has a plurality of radially arranged and axially extending grooves 22 at the outer circumference thereof, slidably supporting a plurality of vanes 24 therein.

The diameter of the rotor 20 generally corresponds to the internal diameter of the cylinder block 14 at the short diameter portion thereof, and thus the respective vanes 24 are fully retracted in the associated grooves 22 at the short diameter portion. The internal diameter of the cylinder block 14 then becomes greater toward the long diameter portion thereof, and thus the vanes 24 are projected radially outwardly by centrifugal force and the back pressure applied to the internal ends thereof, such as the pressure in back pressure chambers 26, or by springs (not shown) arranged therein. Accordingly the pumping chamber 16a is defined between the adjacent two vanes 24 and between the outer surface of the rotor 20 and the inner surface of the cylinder block 14. The volume of the pumping chamber 16a is varied, to compress the air or other media, as the rotor 20 rotates. The air or other media is sucked from an intake port 28 via an inlet opening 30 provided in the cylinder block 14 and delivered to two outlet chambers 34 provided between the cylinder block 14 and the housing 10 via two outlet openings 36. These pumping chambers 16a are located on either side of the short diameter portion. Leaf check valves 38 are located at the outlet openings 36, respectively.

As shown in FIG. 1, a pair of inner sleeve members 40 are fitted or embedded in the inner surface of the cylinder block 14. The inner sleeve members 40 generally have half profiles of the inner elliptic surface of the cylinder block 14 but the total circumferential length thereof is somewhat smaller than that of the inner elliptic surface of the cylinder block 14. Thus portions of the inner wall of the cylinder block 14 project between and separate the inner sleeve members 40 at the short diameter portion. The inner sleeve members 40 and the inner projecting wall portions 42 constitute the inner surface of the cylinder block 14 which slidably receives the vanes 24.

According to the present invention, the cylinder block 14 and the rotor 20 are made from aluminum alloy and the inner sleeve members 40 and the vanes 24 are made from a ferrous material, such as iron or steel. This combination provides a generally light weight and wear-resistant rotary compressor 10 in which the surface in contact with the vanes is reinforced. At the short diameter portion, the vanes 24 are rectracted in the respective grooves 22. More particularly, the vanes 24 are fully retracted by the high pressure prevailing in the compressed pumping chamber 16a after the trailing vane 24 has passed the outlet opening 36. The outer surface of the rotor 20 is thus brought into engagement with the inner projecting walls 42 with a very small clearance therebetween, which improves the seal between the upstream outlet pressure region and the downstream inlet pressure region. In this case, wear of the engaging surfaces is further reduced if the rotor 20 and the inner projecting walls 42 are formed from the same aluminum alloy.

The cylinder block 14 with the inner sleeve members 40 embedded therein is formed by the following steps.

Figure 2:
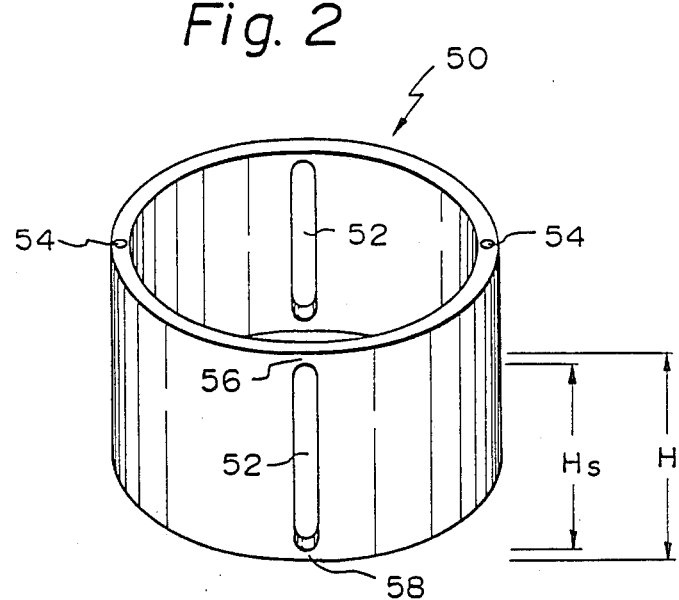
FIG. 2 is a perspective view of an original inner sleeve member prepared in accordance with the present invention.

FIG. 2 illustrates an original form 50 prepared for making the inner sleeve members 40. The original form 50 is made from a ferrous material and has an elliptic contour which conforms to that of the inner surface of the cylinder block 14. The inner diameter of the original form 50 is slightly smaller than that of the finished inner surface of the cylinder block 14, and has a thin thickness and a height "H", which is greater than that of the finished cylinder block 14. The original form 50 also has a pair of axially extending slits 52 located at diametrically opposite positions relative to the short diameter portion and a pair of locating holes 54 relative to the long diameter portion. The axial length "Hs" of the slits 52 is shorter than the height "H", and accordingly, a top rim portions 56 and a bottom rim portion 58 extend above and below the slits 52, respectively, to define the top and bottom margins thereof. The top and bottom rim portions 56 and 58 are circumferentially closed portions and integral with the original form 50. Therefore, the original form 50 has a rigidity sufficient to maintain the shape as illustrated even if subjected to a molding pressure.

The original form 50 is then inserted in a molding sand 60, at the center thereof. The molding sand 60 has a cavity 62 formed therein to receive a molten aluminum alloy and cast the melt as the cylinder block 14. Locating pins 64 are provided at the bottom of the molding sand 60 to enter the locating holes 54 of the original form 50 to ensure an exact location of the original form 50 relative to the cylinder block 14. Therefore, the slits 52 can be located relative to the short diameter portion of the cylinder block 14. A core 66 is fitted inside of the original form 50. During this casting process, the rigid original form 50 is not locally affected by the pressure of the molten metal and can self locate at the center of the molding sand 60. In the prior art, the split inner sleeve members were affected by the local pressure and pushed out of position.

Figure 4:
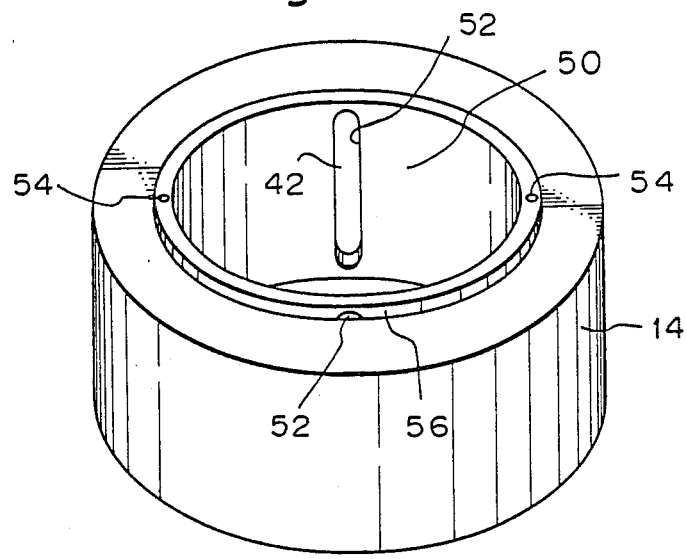
FIG. 4 is a perspective view of the cylinder block after the casting but before the machining.

FIG. 4 illustrates the cast cylinder block 14. As previously described, the cylinder block 14 has the height "H" which is greater than that of the finished cylinder block 14, and thus the top rim portion 56 extends above the top surface of the cylinder block 14. The bottom rim portion 58 may also extend below the bottom surface of the cylinder block 14. The top margin of the slit 52 rises above the top surface of the cylinder block 14, since the length "Hs" of the slits 52 is also greater than the height of the cylinder block 14.

Figure 5:
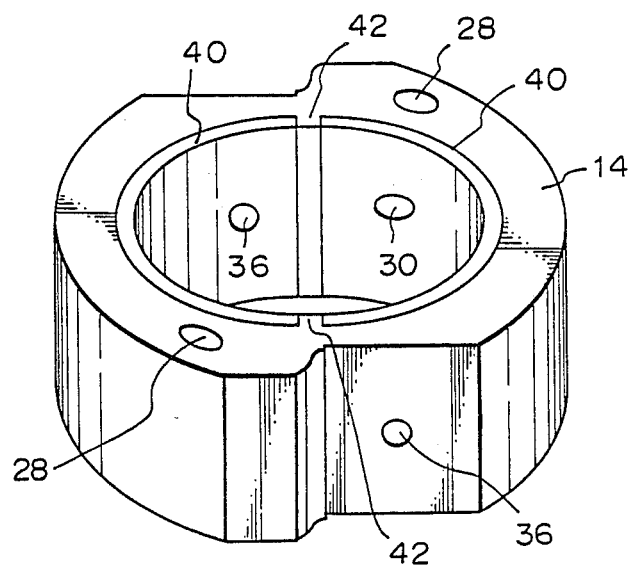
FIG. 5 is a perspective view of the cylinder block after the machining.

This cylinder block 14 with top and bottom rim portions 56 and 58 projecting therefrom is then machined. The purpose of the machining operation is to finish the cylinder block 14 to a desired shape, including the cutting of the inner and outer surfaces of the cylinder block 14 and the boring of the inlet port 28, inlet opening 30, and outlet opening 36. A further purpose of the machining operation is to cut away the projecting top and bottom rim portions 56 and 58 and thus cause the original form 50 to be separated by the slits 42 into two split inner sleeve members 40, as shown in FIG. 5. The inner surface of the molten metal which has entered through the slits 52 during the casting process, is machined at the same time to provide the inner projecting walls 42 between the split inner sleeve members 40.

The locating holes 54 provided at the top rim portion 56 can be also used in this machining operation to ensure an exact machining of the inner and outer profiles and the inlet port 28, inlet opening 30, and outlet opening 36 of the cylinder block 14. The locating holes 54 are thereafter removed when the top rim portion 56 is cut away.

Since the split inner sleeve members 40 can be exactly located relative to each other and relative to the cylinder block 14 during the casting process, it is possible to make the thickness of the inner sleeve members 40 relatively thin, even though they will be machined after the casting process. These thin walled inner sleeve members 40 are elastically deformable, and thus can absorb the difference of thermal expansion between the aluminum alloy and the ferrous material. When cooled after casting, the aluminum alloy cylinder block 14 contracts inward, accompanying the inward elastic deformation of the inner sleeve members 40. Then made hot during the operation of the rotary compressor 10, the aluminum alloy cylinder block 14 will thermally expand, and the elastically deformed inner sleeve members 42 will also expand, and thus a smooth inner surface of the cylinder block 14 is maintained by preventing the possible occurrence of steps between the inner sleeve member 40 and inner projecting walls 42. These inner projecting walls 42 are quickly cooled after the completion of the casting, and thus the metallography structure is improved at that point.

Figure 6:
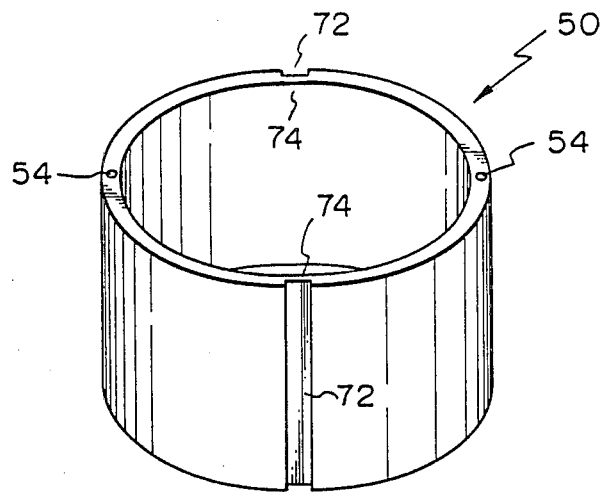
FIG. 6 is a perspective view of an original inner sleeve member prepared in accordance with the second embodiment of the present invention; and, FIG. 7 is a perspective view of the cylinder block after the casting but before the machining.

FIG. 6 illustrates an original form 50 of the second embodiment of the present invention. This original form 50 has a general configuration similar to that shown in FIG. 2 but is provided with a pair of axially extending grooves 72 in place of the slits 52. The grooves 72 are recessed from the outer surface and therefore open thereat. The bottom walls 74 of the grooves 72 are integral to the body portion of the original form 50, and thus are circumferentially consecutive therewith. The height of this original form 50 may be equal to or greater than that of the finished cylinder block 14.

Figure 3:
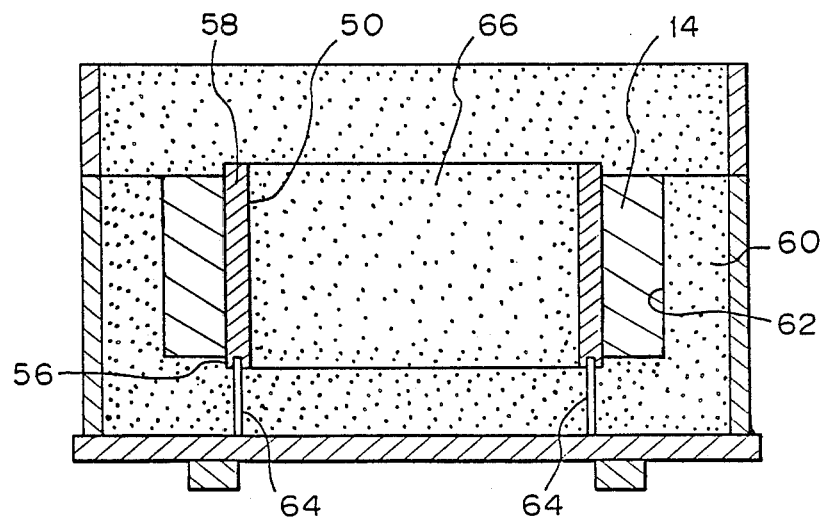
FIG. 3 is a sectional view of the casting mold for casting the cylinder block with the original inner sleeve member inserted therein.
Figure 7:
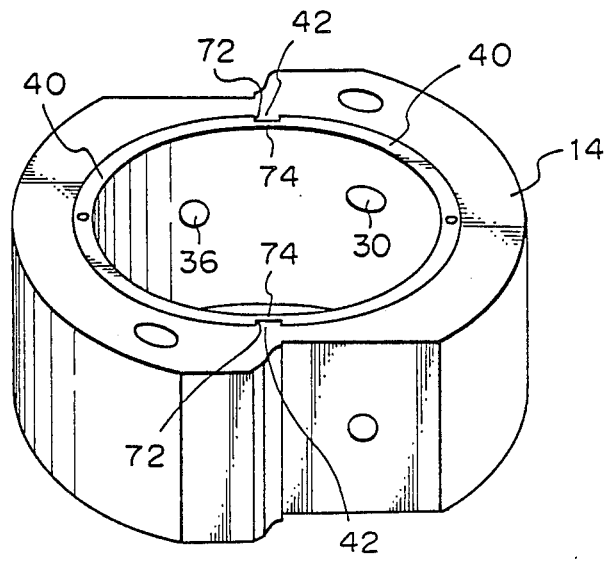

This original form 50 is inserted in the sand mold, such as shown in FIG. 3, and the cylinder block 14 is obtained by the casting process as shown in FIG. 7. It will be seen that the bottom walls 74 of the grooves 72 are integral with the body portion of the original form 50, and the inwardly projecting walls 42 have entered the grooves 72 but are covered by the bottom walls 74 of the grooves 72.

After the casting process, the cylinder block 14 with the original form 50 embedded therein is machined. The machining operation also includes the finish shaping of the cylinder block 14, during which the circumferentially closed portion of the original form 50 is removed; i.e., an internal surface portion of the original form 50 including the bottom wall 74 is removed so that the original form 50 is separated by the grooves 72 into the split inner sleeve members 40. The removal of the bottom wall 74 reveals the inner projecting walls 42 as a part of the inner surface of the cylinder block 14.

We claim:

1. A method for manufacturing a cylinder block of a rotary compressor with radial vanes, siad cylinder block having an eccentric inner surface in slidable contact with said radial vanes, said method comprising the steps of: preparing an inner sleeve means of a ferrous material having at least a circumferentially closed integral portion; casting an outer body of said cylinder block from an aluminum alloy material about the inner sleeve means to embed said inner sleeve means in said outer body; machining said inner sleeve means and machining away said circumferentially closed integral portion; whereby said inner sleeve means is separated into a plurality of split inner sleeve members with aluminum alloy material between said split inner sleeve members which constitutes said eccentric inner surface of said cylinder block.

2. A method according to claim 1, wherein the number of said plurality of split inner sleeve members is two and said eccentric inner surface of said cylinder block is shaped to a contour having a long diameter portion and a short diameter portion.

3. A method according to claim 2, wherein said inner sleeve means comprises a pair of longitudinally extending recesses, located at diametrically opposite positions relative to said short diameter portion of said cylinder block, said recesses at least at the outer surface of said inner sleeve means, the aluminum alloy material entering said longitudinally extending recesses during the casting step.

4. A method according to claim 3, wherein said recesses are a pair of longitudinally extending slits and said inner sleeve means comprises a pair of circumferentially closed integral portions at the top and the bottom thereof to define said slits, said pair of circumferentially closed integral portions at the top and bottom being removed during said machining step to separate said inner sleeve means into two split inner sleeve members and the aluminum alloy material entering said longitudinally extending slits during the casting step becoming a part of the inner surface of said cylinder block between said two split inner sleeve members.

5. A method according to claim 4, wherein the length of said slits is greater than the length of said outer body.

6. A method according to claim 4, wherein said rotary compressor has a circular rotor slidably supporting said radial vanes, and an internal diameter of said cylinder block, measured at said short diameter portion where said aluminum alloy is located corresponding to the diameter of said rotor with a small clearance therebetween.

7. A method according to claim 3, wherein said recesses are a pair of longitudinally extending grooves opening at the outer surface of said inner sleeve means; said inner sleeve means having a circumferentially consecutive inner wall which constitutes the bottom wall of said grooves, a portion of said circumferentially consecutive inner wall being removed during said machining step and after the machining step, the aluminum alloy material which entered said longitudinally extending grooves during the casting step is exposed and separates said two split inner sleeve members and becomes a part of the inner surface of said cylinder block between said inner sleeve members.

8. A method according to claim 7, wherein said rotary compressor has a circular rotor slidably supporting said radial vanes, the internal diameter of said cylinder block measured at said short diameter portion where said aluminum alloy is located corresponding to the diameter of said rotor with a small clearance therebetween.

* * * * *